(12) United States Patent
Lopes et al.

(10) Patent No.: US 6,718,083 B2
(45) Date of Patent: Apr. 6, 2004

(54) OPTICAL SWITCH AND ROUTER

(75) Inventors: Ward Lopes, Chicago, IL (US); Kenneth Bradley, Chicago, IL (US)

(73) Assignee: Arryx, Inc., Chicago, IL (US)

( * ) Notice: Subject to any disclaimer, the term of this patent is extended or adjusted under 35 U.S.C. 154(b) by 0 days.

(21) Appl. No.: 10/394,172

(22) Filed: Mar. 24, 2003

(65) Prior Publication Data

US 2003/0185490 A1 Oct. 2, 2003

Related U.S. Application Data

(63) Continuation of application No. 09/886,698, filed on Jun. 20, 2001, now abandoned.

(51) Int. Cl.[7] .................................................. G02B 6/26
(52) U.S. Cl. ...................................................... 385/16
(58) Field of Search ............................... 385/16, 1, 2, 5, 385/7, 8, 14, 15, 31, 40

(56) References Cited

U.S. PATENT DOCUMENTS

| 3,407,294 | A | 10/1968 | Hill |
| 3,589,794 | A | 6/1971 | Marcatili |
| 3,710,279 | A | 1/1973 | Ashkin |

(List continued on next page.)

FOREIGN PATENT DOCUMENTS

| JP | 05-88107 A | 4/1993 | |
| JP | 03248946 | 4/1993 | |
| JP | 409089780 A | 4/1997 | |
| WO | WO 98/17044 | 4/1998 | |
| WO | WO 98/53535 | 11/1998 | |
| WO | WO 99/39223 | 5/1999 | |
| WO | WO 00/29886 | * 5/2000 | ............... 385/24 |
| WO | WO 00/35057 | * 6/2000 | ................ 385/2 |
| WO | WO 01/59497 A1 | 8/2001 | |
| WO | WO 01/63707 A1 | 8/2001 | |

OTHER PUBLICATIONS

Cai et al. (Optics letters, vol. 25, No. 4, Feb. 15, 2000, pp. 260–162).*

Ming et al. (IEE Photonics Technology Letters, vol. 11, No. 6, Jun. 1999).*

U.S. patent application Ser. No. 10/038,651, Maleki et al., filed Nov. 8, 2001.

U.S. patent application Ser. No. 10/004,411, Yariv, filed Jun. 21, 2001.

U.S. patent application Ser. No. 10/018,611, Maleki et al., filed Feb. 14, 2002.

Holtz, J. H. and Asher, S. A., "Polymerized Colloidal Crystal Hydrogel Films as Intelligent Chemical Sensing Materials", Nature, vol. 389, pp. 829–832, Oct. 23, 1997.

Ashkin, A., "Optical Trapping and Manipulation of Neutral Particles Using Lasers", J. Proc. Natl. Acad. Sci. USA, vol. 94, pp. 4853–4860, May 1997.

Ballman, E. and Axner, O., "Design for Fully Steerable Dual–Trap Optical Tweezers", Applied Optics, vol. 36, No. 10, pp. 2107–2113, Apr. 1, 1997.

van Blaaderen, A. et al., "Template–Directed Colloidal Crystallization", Nature, vol. 385, pp. 321–324, Jan. 23, 1997.

(List continued on next page.)

*Primary Examiner*—Frank G. Font
*Assistant Examiner*—Kevin C Kianni
(74) *Attorney, Agent, or Firm*—Sonnenschein Nath & Rosenthal LLP (57) ABSTRACT

An optical switch and optical router to rapidly (in the range of nanoseconds to picoseconds) route signals from particular channels within an optical band by using optical switches which utilize a controlled whispering gallery mode (WGM) resonance of dielectric microspheres to optically switch signal by virtue of their evanescent waves.

1 Claim, 4 Drawing Sheets

U.S. PATENT DOCUMENTS

| | | | |
|---|---|---|---|
| 3,793,541 A | | 2/1974 | Ashkin et al. |
| 3,808,432 A | | 4/1974 | Ashkin |
| 3,808,550 A | | 4/1974 | Ashkin |
| 4,127,329 A | | 11/1978 | Chang et al. |
| 4,627,689 A | | 12/1986 | Asher |
| 4,720,160 A | * | 1/1988 | Hicks, Jr. .................... 359/173 |
| 4,827,125 A | | 5/1989 | Goldstein |
| 4,887,721 A | | 12/1989 | Martin et al. |
| 4,893,886 A | | 1/1990 | Ashkin et al. |
| 5,029,791 A | | 7/1991 | Ceccon et al. |
| 5,079,169 A | | 1/1992 | Chu et al. |
| 5,113,286 A | | 5/1992 | Morrison |
| 5,170,890 A | | 12/1992 | Wilson et al. |
| 5,198,369 A | | 3/1993 | Itoh et al. |
| 5,212,382 A | | 5/1993 | Sasaki et al. |
| 5,231,533 A | | 7/1993 | Gonokami et al. |
| 5,245,466 A | | 9/1993 | Burns et al. |
| 5,327,515 A | | 7/1994 | Anderson et al. |
| 5,343,038 A | | 8/1994 | Nishiwaki et al. |
| 5,355,252 A | | 10/1994 | Haraguchi |
| 5,363,190 A | | 11/1994 | Inaba et al. |
| 5,364,744 A | | 11/1994 | Buican et al. |
| 5,374,556 A | | 12/1994 | Bennett et al. |
| 5,445,011 A | | 8/1995 | Ghislain et al. |
| 5,452,123 A | | 9/1995 | Asher et al. |
| 5,473,471 A | | 12/1995 | Yamagata et al. |
| 5,506,712 A | | 4/1996 | Sasayama et al. |
| 5,512,745 A | | 4/1996 | Finer et al. |
| 5,629,802 A | | 5/1997 | Clark |
| 5,685,636 A | | 11/1997 | German |
| 5,689,109 A | | 11/1997 | Schutze |
| 5,729,643 A | | 3/1998 | Hmelar et al. |
| 5,752,606 A | | 5/1998 | Wilson et al. |
| 5,776,674 A | | 7/1998 | Wilmer |
| 5,875,272 A | * | 2/1999 | Kewitsch et al. ............. 385/24 |
| 5,926,496 A | * | 7/1999 | Ho et al. ....................... 372/67 |
| 5,935,507 A | | 8/1999 | Morito et al. |
| 5,939,716 A | | 8/1999 | Neal |
| 5,952,651 A | | 9/1999 | Morito et al. |
| 5,953,166 A | | 9/1999 | Shikano |
| 6,007,218 A | | 12/1999 | German et al. |
| 6,009,115 A | * | 12/1999 | Ho ................................ 359/127 |
| 6,052,495 A | * | 4/2000 | Little et al. ..................... 385/2 |
| 6,067,859 A | | 5/2000 | Kas et al. |
| 6,101,300 A | * | 8/2000 | Fan et al. ....................... 385/1 |
| 6,108,121 A | | 8/2000 | Mansell et al. |
| 6,115,519 A | | 9/2000 | Espindola et al. |
| 6,139,831 A | | 10/2000 | Shivashankar et al. |
| 6,142,650 A | | 11/2000 | Brown et al. |
| 6,154,591 A | | 11/2000 | Kershaw |
| 6,180,940 B1 | | 1/2001 | Galstian |
| 6,190,022 B1 | | 2/2001 | Tocci et al. |

OTHER PUBLICATIONS

Chiou, A.E. et al., "Interferometric Optical Tweezers", Optics Communications, 133, pp. 7–10, Jan. 1, 1997.

Visscher, K. et al., "Construction of Multiple–Beam Optical Traps with Nanometer–Resolution Position Sensing", IEEE Journal of Selected Topics in Quantum Electronics, vol. 2, No. 4, pp. 1066–1075, Dec. 1996.

Suzuki, A. et al., "Optical Switching in Polymer Gels", J. Appl. Phys. 80(1), pp. 131–136, Jul. 1, 1996.

Suzuki, A. et al., "Hysteretic Behavior and Irreversibility of Polymer Gels by pH Range", J. Chem. Phys. 103/911), pp. 4706–4710, Sep. 15, 1995.

Xiang, X. D. et al., "A Combinatorial Approach to Materials Discovery", Science, vol. 268, pp. 1738–1740, Jun. 23, 1995.

Murray, C A and Grier, D G, "Colloidal Crystals", American Scientist, vol. 83, pp. 238–245, May–Jun. 1995.

Mason, T G and Weitz, D A, "Optical Measurements of Frequency–Dependent Linear Viscoelastic Modula of Complex Fluids" Physical Review Letters, vol. 74, No. 7, pp. 1250–1253, Feb. 13, 1995.

Crocker, J C and Grier, D G, "Microscopic Measurement of the Pair Interaction Potential of Charge–Stabilized Colloid", Physical Review Letters, vol. 73, No. 2, pp. 352–355, Jul. 11, 1994.

Sasaki, K. et al., "Optical Micromanipulation of a Lasing Polymer Particle in Water", Jpn. J. Appl. Phys., vol. 32, Part 2, No. 8B, pp. 1. 1144–1. 1147, Aug. 15, 1993.

Afzal, R.S. and Treacy, F.B., "Optical Tweezers Using a Diode Laser", Rev. Sci. Instrum 63(4), pp. 2157–2163, Apr. 1992.

Ashkin, A., "Forces of a Single Beam Gradient Laser Trap on a Dielectric Sphere in the Ray Optics Regime", Biophysical Journal, vol. 61, pp. 569–582, Feb. 1992.

Misawa, H. et al., "Multibeam Laser Manipulation and Fixation of Microparticles", Appl. Phys. Lett., vol. 60, No. 3, pp. 310–312, Jan. 20, 1992.

Sasaki, K. et al., "Pattern Formation and Flow Control of Fine Particles by Laser–Scanning Micromanipulation", Optics Letters, vol. 16, No. 19, pp. 1463–1465, Oct. 1, 1991.

Sasaki, K. et al., "Laser–Scanning Micromanipulation and Spatial Patterning of Fine Particles", Japanese Journal of Applied Physics, vol. 31, No. 5B, pp. 1. 907–1. 909, May 1991.

Misawa, H. et al., "Spatial Pattern Formation Size Selection, and Directional Flow of Polymer Latex Particles by Laser Trapping Technique", Chemistry Letters, 469–472, 1991.

Burns, M M et al., "Optical Matter: Crystallization and Binding in Intense Optical Fields", Science, vol. 249, pp. 749–754, Aug. 17, 1990.

Burns, M M et al., "Optical Binding", Physical Review Letters, vol. 63, No. 12, pp. 1233–1236, Sep. 18, 1989.

Ashkin, A., et al., "Optical Trapping and Manipulation of Single Cells Using Infrared Laser Beams", Nature, vol. 330, pp. 769–771, Dec. 24–31, 1987.

Ashkin, A., et al., "Observation of a Single–Beam Gradient Force Optical Trap for Dielectric Particles", Optics Letters, vol. 11, No. 5, pp. 288–290, May 1986.

Chowdhury, A. et al., "Laser–Induced Freezing", Physical Review Letters, vol. 55, No. 8, pp. 833–836, Aug. 19, 1985.

Fournier, J.M.R. et al., "Writing Diffractive Structures by Optical Trapping", SPIE, vol. 2406, pp. 101–111.

Grier, D. G. and Korda, P T., "Lateral Deflection of Flowing Particles by a Static Array of Optical Tweezers", Dept. of Physics, James Franck Institute and Institute for Biophysical Dynamics, U. of Chicago, Aug. 6, 2001.

Sun, Chi–Kuang et al., "Cell manipulation by use of diamond microparticles as handles of optical tweezers", J Opt Soc Am B. vol. 18, No. 10, pp. 1483–1489, Oct. 2001.

Liesener, J. et al. "Multi–functional optical tweezers using computer–generated holograms", J. Optics Communications, 185(2000), pp. 77–82.

Mogensen, P C et al., "Dynamic array generation and pattern formation for optical tweezers", J Optics Communications, 175(2000), pp. 75–81.

Dufresne, E.R and Grier, D G "Optical tweezer arrays and optical substrates created with diffractive optics", Review of Scientific Instruments, vol. 69, No. 5, pp. 1974–1977, May 1998.

Dufresne, E.R et al., "Computer-generated holographic optical tweezer arrays", Review of Scientific Instruments, vol. 72, No. 3, pp. 1810–1816, Mar. 2001.

Korda, P. et al., "Nanofabrication with Holographic Optical Tweezers"—http://griergroup.uchicago.edu/~grier/fillingb/.

Module Laser Tweezers®1064/1500, PN 80500025 Rev. A. Cell Robotics, Inc., 2715 Broadbent Pkwy NE., Albuquerque, NM 87107.

Paterson, I., et al., "Controlled rotation of optically trapped microscopic particles", Science May 4, 2001, 292(5518):912–4, Abstract.

Svoboda, K. et al., Direct Observation of Kinesin Stepping by Optical Trapping Interferometry, Nature, 365, 721–7, 1993.

Finer, J.T. et al., "Single Myosin Molecule Mechanics Piconewton Forces and Nanometre Steps", Nature 368 113–9, 1994.

Vergel, C. et al., "The Stiffness of Rabbit Skeletal Actomyosin Cross-Bridges Determined with an Optical Tweezers Transducer", Biophysical Journal 75:1424–1438, 1998.

Block, S.M., "Making light work with optical tweezers", Nature 360:493–495 (1992).

Schnelle, T. et al., "Trapping in AC octode field cages", J. Electrostat 50(1) Sep. 17–29, 2000.

Greulich, K O et al., "Manipulation by laser microbeam and optical tweezers from plant cells to single molecules", J. Microscopy, vol. 198 182–187 Part 3, Jun. 2000.

Green, N G and Morgan, H., "Dielectrophoretic separation of nano–particles", J. Phys. D. Appl. Phys. 30(11) 1.41–1.44, Jun. 7, 1997.

He, H. et al., "Optical particle trapping with higher–order doughnut beams produced using high efficiency computer generated holograms", J Mod Opt 42:217–223, 1995.

Gahagan, K.T. et al., "Optical vortex trapping of particles", Opt Lett 21 827–829, 1996.

Friese, J F J, et al., "Optical angular–momentum transfer to trapped absorbing particles", Phys Rev A 54 1593–1596, 1996.

Arryx BioRyx™ 200 System, Revolutionary Technology enabling breakthrough research, Arryx, Inc 316 North Michigan Avenue, Suite C1.20. Chicago, IL 60601–3712.

Tatum, Christine, Guiding light gains firm grip, Business Technology, Chicago Tribune, Section 4, Monday, Feb. 5, 2001.

"Laser Tweezers Transport Cell–Size Liposomes", Photonics Technology News, Apr. 2002, http://www.phototonics.com/Spectra/Tech/apr02/techTweezers.asp.

Shaw, R.W. et al., "Time–domain observation of optical pulse propagation in whispering–gallery modes of glass spheres", Optics Letters, 23, p. 1301, (1998).

Cai, M. et al., "Highly efficient optial power transfer to whispering–gallery modes by use of a symmetrical dual–coupling configuration", Optics Letters, 25, p. 260, (2000).

Knight, J.C. et al., "Phase–matched excitation of whispering–gallery–mode resonances by a fiber taper", Optics Letters, 22, p. 1129, (1997).

Gorodetsky, M.L. et al., "Ultimate Q of optical microsphere resonators", Optics Letters, 21, p. 453, (1996).

Maleki, I. et al., "Whispering–gallery–mode microspheres as light modulators", NASA Tech. Brief, 25, No. 11 from JPI, New Technology Report NPO–20664, Nov. 2000.

Cai, M. et al., "Highly efficient hybrid fiber taper coupled microsphere laser", in OSA Trends in Optics and Photonics (TOPS) vol. 56 Conference on Lasers and Electro–Optics (CLEO 2001), Technical Digest, Postconference Edition (Optical Society of America, Washington, D.C. 2001), pp. 114–116.

Cai, M. et al., "Fiber–Optic Add–Crop Device Based on a Silica Microsphere–Whispering Gallery Mode System", IEEE Photonics Technology Letters, 11, p. 686, (1999).

"Whispering–Gallery–Mode Microspheres as Light Modulators", http://www.nasatech.com/Briefs/Nov00/NPO20664.html.

Owrutskyk, J C et al., "Optical properties and dynamics of a photochromic bisthienylethene in solution and in a polymer film", Chemical Physics Letters, 293, pp. 555–563, 1998.

Cai, M et al., "Observation of Critical Coupling in a Fiber Taper to a Silica–Microsphere Whispering–Gallery Mode System", Physical Review Letters, vol. 85, No. 1, pp. 74–77, Jul. 3, 2000.

Ogura, Y. et al., "Optical manipulation of microscopic objects by means of vertical–cavity surface–emitting laser array sources", Applied Optics, vol. 40, No. 30, pp. 5430–5435, Oct. 20, 2001.

"Simple Fiber–Optic Coupling for Microsphere Resonators", http://www.nasatech.com/Briefs/May01/NPO20619.html.

"Highly Efficient Coupling in a Fiber Taper to a Silica Microsphere Whispering–Gallery–Mode System".

Kilper, D.C. et al., "Optical Feedback and Coupling Characteristics of Microsphere Resonators" Opto Southeast, Sep. 2000.

* cited by examiner

OPTICAL SWITCH AND ROUTER

This application is a Continuation Application under 37 CFR 1.53(b) of U.S. application Ser. No. 09/886,698, filed Jun. 20, 2001 now abandoned, the contents of which are herein incorporated by reference to the extent allowed by law.

BACKGROUND OF THE INVENTION

Throughout this application one or more publications are referenced with parentheses. The disclosures of such publications in their entireties are hereby incorporated by reference in this application in order to more fully describe the state of the art to which this invention pertains.

1. Field of the Invention

The present invention relates generally to optical switching. In particular, the invention relates to methods, devices and systems to optically switch a specific channel of light between optical fibers.

2. Discussion of the Related Arts

Dielectric microspheres are known in the art. It has been shown that a microsphere of the appropriate proportions can form a wavelength specific connection from one optical fiber to another by virtue of the dielectric microsphere's resonance in a whispering gallery mode (WGM) for the specific wavelength. The WGM may be used to switch light transmission from one optical fiber to another. Depending on the placement of the microsphere and nature of the optical fibers, fairly high efficiency of light transfer may be achieved. Ming, Cai and Kerry Vahala Opt. Lett 25, No. 4, 260 (2000).

Wavelength Division Multiplexing (WDM) is a technique which has been used to enhance the signal capacity of a single mode optical fiber by simultaneously transmitting multiple discreet wavelengths of light, referred to as "channels" in a single band. The wavelengths in each channel are separated by a pre-determined spacing usually in the order of hundreds of GHZ. Dense Wavelength Division Multiplexing (DWDM) systems are characterized by closer spacing between the respective wavelengths comprising the channels thereby allowing for a greater number of channels within the same band in the same optical fiber as compared to WDM.

The speed of routing from one optical fiber to another is limited by the rate at which the optical switching occurs. In the past, switches which convert the optical data to electronic data have been a "bottleneck" in the system. Those acquainted with optical switching will recall that much interest has been shown in achieving the goal of a direct optical to optical switch which would eliminate the bottleneck caused by the optical to electronic conversions of the past. A variety of devices have been developed in pursuit of achieving this goal.

Common to many optical to optical switches and optical routers is an all or nothing functionality by which the entire signal, within a channel, is switched or not switched. While useful for small or local networks, especially those networks with easily controlled light sources (lasers), in larger or less controlled environments an optical router must be able to accept signals from a variety of sources and seamlessly multiplex despite, difference in the quality of the signals. Optical switches lacking the ability to monitor, equalize and/or groom the channels in nanoseconds or even picoseconds, (which is "real time" for optical transmissions) may yield turbidity within a band resulting in unbalanced light transmissions (signals) from channel to channel which in turn may cause noise, loss of part of a signal or channels to drop out.

Accordingly, there exists a need for an optical switch and router that operate in "real time" (which is in the order of nanoseconds or picoseconds) for light transmission. There also exists a need for an optical router of "real time" optical switches which can monitor, groom, and/or balance a channel relative to the other channels in an optical band. The present invention satisfies these needs and others and provides related advantages.

SUMMARY OF THE INVENTION

The present invention provides a novel and improved method, system and device to rapidly (in the range of nanoseconds and event picoseconds) route signals from particular channels within an optical band by using optical switches which utilize the whispering gallery mode (WGM) resonance of dielectric microspheres to optically switch signal. All references made hereinafter to microsphere(s) shall refer to dielectric microsphere(s).

In all embodiments an optical router is formed of a series of optical switches. Common to the optical switches is the placement of a microsphere in proximity to the unclad or thinly clad regions of a pair of optical fibers. To switch the signal of a particular channel (wavelength of light) between optical fibers, the evanescent waves emanating from the electromagnetic fields associated with the signal in the particular channel are allowed to resonate across a wavelength specific microsphere via the WGM of the microsphere to another optical fiber.

In one embodiment of the optical router, the optical switches are formed of microspheres. Each microsphere has a steady state index of refraction "n" and will resonate in WGM for a specific wavelength of light (channel) when positioned between optical fibers at a region of thinned or removed cladding with substantially similar indexes of refraction.

Switching is accomplished by controlling the steady state index of refraction "n" of a microsphere. A pair of electrodes placed on either side of each microsphere can be used to apply a voltage across the microsphere. When an adequate voltage is applied across the electrode pair the steady state index of refraction "n" of the microsphere is altered by the polarizing effect of the voltage on the substrate of the microsphere. The polarization changes the dielectric constant of the substrate which in turn alters the steady state index of refraction "n" of the microsphere. In the case where the steady state index of refraction "n" of the microsphere is substantially similar to the index of refraction of the optical fibers the voltage will cause the steady state index of refraction "n" of the microsphere to become sufficiently dissimilar from the index of refraction of the optical fibers to preclude WGM resonance.

To switch a particular optical switch within the optical router the voltage across the electrode pair need only be briefly interrupted (in the order of a few nanoseconds to a few picoseconds), to allow the signal to pass from one optical fiber to another. Accordingly, an optical router useful for WDM, DWDM and wavelength division de-multiplexing is achieved.

Conversely, by selecting a microsphere with a steady state index of refraction "n" dissimilar to the index of refraction of the optical fibers and applying sufficient voltage across the electrode pair to alter the index of refraction of the microsphere it would be substantially similar to the index of refraction of the optical fibers thereby enabling WGM resonance of the microsphere while the voltage is applied.

Adjustment of the voltage may also provide for a controllable index of refraction of "n±x," for the microsphere, wherein as "x" approaches zero the efficiency of the transfer of signal approaches the microsphere's maximum obtainable efficiency which may be useful for applications such as channel equalizing, grooming and power balancing.

In another embodiment, a plurality microspheres are provided, each with a light activated material, such as a dye, integrated within their substrate. To form the optical router, a series of optical switches, each containing microspheres selected to resonate in WGM for specific channels, are positioned in close proximity to an unclad or thinly clad region in each of two optical fibers.

Each optical switch operates by controlling the irradiation of the microsphere with an appropriately intense beam of light. The irradiation will activate the light activated material and depending on the selection of the light activated material and microsphere substrate, the irradiation will either change the dielectric constant of the light activated material and affect the average dielectric constant of the microsphere, or affect the dielectric constant of the light activated material and the substrate, thereby altering the dielectric constant of the microsphere. In either case, the change in the dielectric constant will alter the steady state index of refraction "n" of the microsphere.

If the steady state index of refraction "n" of the microsphere is substantially similar to the index of refraction of the optical fibers, the irradiation can be used to alter the steady state index of refraction "n" to become dissimilar to that of the optical fibers and disrupt the WGM resonance. A practical application of such a microsphere would be to maintain an appropriately intense beam of light directed at the microsphere until switching of the channel corresponding to that microsphere is required. A brief interruption in the intense beam of light will result in switching. On the other hand, if the steady state index of refraction "n" of the microsphere is dissimilar to the index of refraction of the optical fibers, a brief pulse of irradiation can be used to alter the index of refraction "n" of the microsphere to become substantially similar to the index of refraction of the optical fibers and thereby switch the channel by enabling the WGM resonance.

In either case, by passing the intense beam of light through a Mach-Zender interferometer the speed at which the intense beam of light can be pulsed "on" or "off" is in the range of nanoseconds to picoseconds.

Moreover, adjustment of the intensity of the intense beam of light, in either case, may also provide for a controllable index of refraction of "n±x," for the microsphere, wherein as "x" approaches zero, the efficiency of the transfer of signal approaches the microsphere's maximum obtainable efficiency which may be useful for applications such as channel equalizing, grooming and power balancing.

In another embodiment of an optical router, each microsphere comprising a specific optical switch has a steady state index of refraction "n" which always corresponds to the index of refraction of the optical fibers. Optical switching occurs when the selected microsphere is physically contained within an optical trap an moved towards the unclad or thinly clad regions of two optical fibers. At some proximity from the optical fibers the evanescent wave, associated with the signal of the selected channel, will traverse the surface of the selected microsphere via WGM resonance, and switch signal one optical fiber to another optical fiber. When the switching is completed, the optical trap is quickly withdrawn and the microsphere ceases to resonate the signal in WGM.

Adjustment of the proximity of the microsphere to the stripped or thinly cladded region of the optical fibers will provide a controllable index of refraction of "n±x" for the microsphere, wherein as "x" approaches zero, the efficiency of the transfer of signal approaches the microsphere's maximum obtainable efficiency which may be useful for applications such as channel equalizing, grooming and power balancing.

In each embodiment the routing of the appropriate wavelength of light from one optical fiber to another is dependent on the propagation of an evanescent wave to a corresponding microsphere which acts in a WGM. The switching "on" or "off" of the microsphere is either by physical movement or by altering the microsphere's steady state index of refraction "n".

DETAILED DESCRIPTION OF THE PREFERRED EMBODIMENTS

Particular embodiments of the invention are described below in considerable detail for the purpose of illustrating its principles and operation. However, various modifications may be made, and the scope of the invention is not limited to the exemplary embodiments described below.

Certain terminology will be used in the following specification, for convenience and reference and not as a limitation, brief definitions are provided below:

A. An "evanescent wave" refers generally to a wave that occurs when a wave enters a region in which it cannot propagate. Typically such waves are characterized by an amplitude which decreases exponentially with distance into the region in which the wave cannot propagate.

B. An "optical fiber" refers generally to an elongated structure of nominally circular cross section comprised of a "core" of relatively high refractive index material surrounded by a "cladding" of lower refractive index material, adapted for transmitting an optical mode in the longitudinal direction.

C. "WDM" refers generally to wavelength division multiplexing: a system capable of simultaneously transmitting data on several wavelength channels.

D. "DWDM" refers generally to dense wavelength division multiplexing: a system capable of simultaneously transmitting data on several wavelength channels with less spacing between the channels than in a WDM system.

E. "WGM" refers generally to whispering gallery mode: a property of microspheres which allows them to form an optical conduit between optical fibers by coupling to the two optical fibers via evanescent waves.

In the preferred embodiments an optical router is formed of a series of optical switches. Common to the optical switches is the placement of a microsphere in proximity to the unclad or thinly clad regions of a pair of optical fibers. To switch the signal of a particular channel (wavelength of light) between optical fibers the WGM resonance of the microsphere for evanescent waves emanating from the electromagnetic fields associated with the signal in a particular channel is controlled either by placement of the microsphere or by altering the steady state index of refraction "n" of the microsphere.

Figure 1:
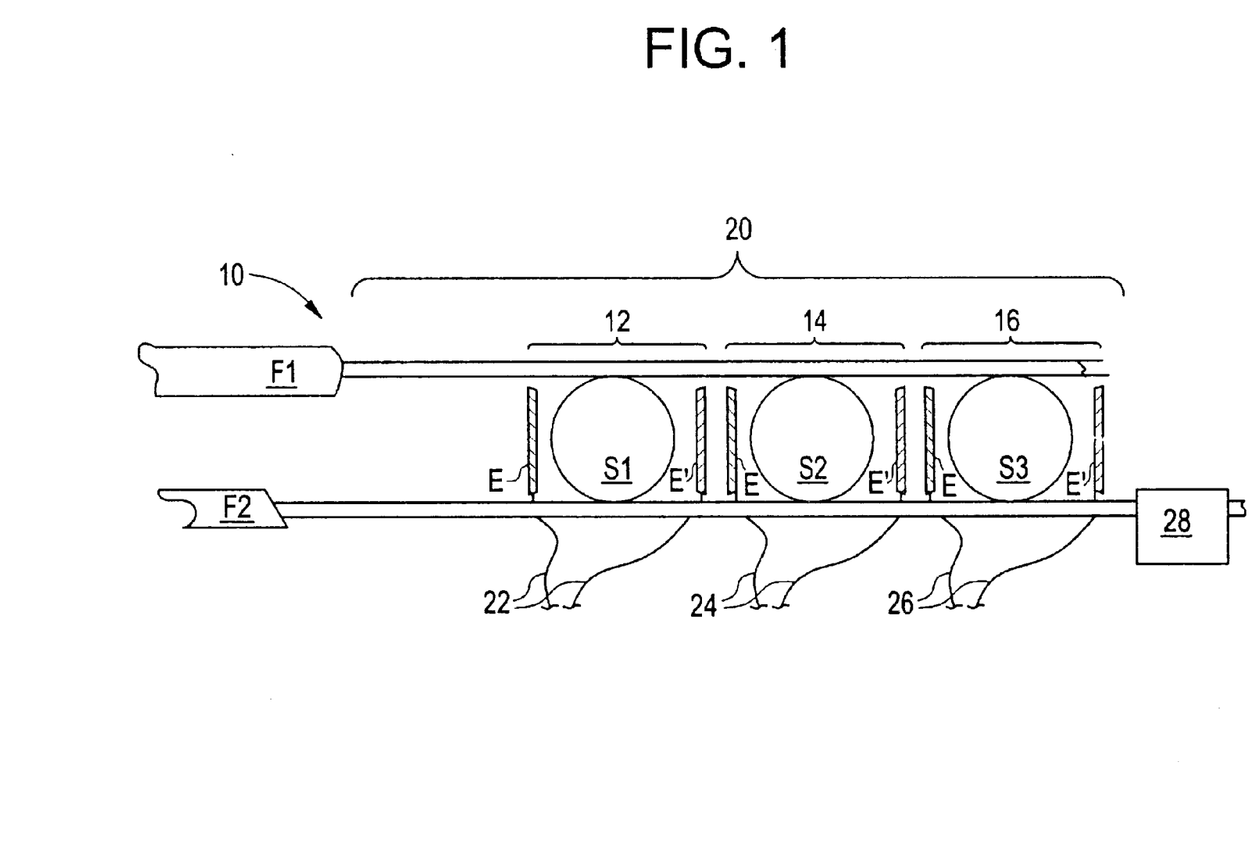
FIG. 1 illustrates a component view of an optical router.

To form the optical router 10 illustrated in FIG. 1, a series of optical switches 14, 16 and 18 are connected across a first and a second optical fiber F1 and F2. The optical router 10, by virtue of the optical switches, is capable of optically routing a number of different channels within an optical band. Each channel contains a signal comprised of a distinct wavelength of light. Hence, the quantity of optical switches within the router 10 will define the number of different channels that router 10 can switch.

Each optical switch 12, 14 and 16 consists of a microsphere S1, S2 or S3 positioned between an electrode pair E & E' and placed in close proximity to a region of thinned or stripped cladding 20 on each optical fiber F1 & F2. Voltage is supplied to each electrode pair E & E' via corresponding pairs of conductive leads 22, 24 and 26 which are attached to a power supply (not shown).

The channel specific functionality of each optical switch derives from the selection of appropriately sized microspheres. Appropriate size refers to the radius of the microsphere wherein $\pi$ times the radius of the microsphere is approximately an integral ½ wavelength of the wavelength of light the microsphere, with its steady state index of refraction "n" resonates for in WGM. Therefore, each microsphere by virtue of its size can be selected to correspond to a single channel carried within the optical band.

In the embodiment shown in FIG. 1, the microspheres are selected with a steady state index of refraction "n" substantially similar to the index of refraction of the optical fibers F1 & F2. Or, stated in terms of optical switches, each microsphere is switched "on" and will operate in a WGM for an evanescent wave, emanating from an optical fiber, of a channel with a signal corresponding to the wavelength of light the given microsphere resonates for. Therefore, absent an adequate voltage across the electrodes pairs E & E', routing of the signals from three channels, corresponding to the wavelengths of light each microsphere S1, S2 and S3 resonates for, will occur via the WGM resonance of each of the three microspheres S1, S2 and S3.

To achieve selected routing adequate voltage across each electrode pair E & E' should be maintained until the switching of a specific channel is desired. The effect of applying adequate voltage across the electrode pairs E & E' is to alter the steady state index of refraction "n" of each microsphere S1–S3 by polarizing the substrate forming the microspheres. The polarization will change the dielectric constant of the substrate which in turn alters the steady state index of refraction "n" making it sufficiently dissimilar from the index of refraction of the optical fibers to preclude WGM resonance and switching will not occur.

When switching of a channel is desired, the voltage across a particular electrode pair E & E' surrounding the selected microsphere S1, S2 or S3 is briefly terminated. During that brief termination the index of refraction "n" the microsphere return to its steady state, which is substantially similar to the index of refraction of the optical fibers F1 & F2, thereby routing the appropriate channel.

Conversely, one may select microspheres which have a steady state index of refraction "n" substantially dissimilar to the index of refraction of the optical fibers F1 & F2, whereby the presence of adequate voltage across an electrode pair E & E' alters the index of refraction "n' of the select microsphere to become substantially similar to the index of refraction of the optical fibers F1 & F2, thereby routing the appropriate channel. In either case the switching "on" or "off" of the voltage across the electrodes E & E' can be accomplished in the range of nanoseconds or even picoseconds, providing a system which can route a channel in real time. Any residual light transmission in a switched optical fiber may, as is commonly the case, be removed with an attenuator 28.

For a given channel, adjustment of the voltage may also provide for a controllable index of refraction of "n±x," for the microsphere, wherein as "x" approaches zero, the efficiency of the transfer of signal approaches the microsphere's maximum obtainable efficiency which may be useful for applications such as channel equalizing, grooming and power balancing.

In FIG. 1, for clarity, only three microspheres S1, S2 & S3 are shown and three electrode pairs 22, 24 & 26. However, it should be understood that a plurality of such microspheres and electrodes corresponding to the number of channels the router 10 switches can be provided. It should also be understood, that one skilled in the art may combine both the microspheres which have a steady state index of refraction "n" substantially similar to the optical fibers and those microspheres that have a steady state index of refraction "n" which is dissimilar to the optical fibers into one router without departing from the intended scope of this invention.

Figure 2A:
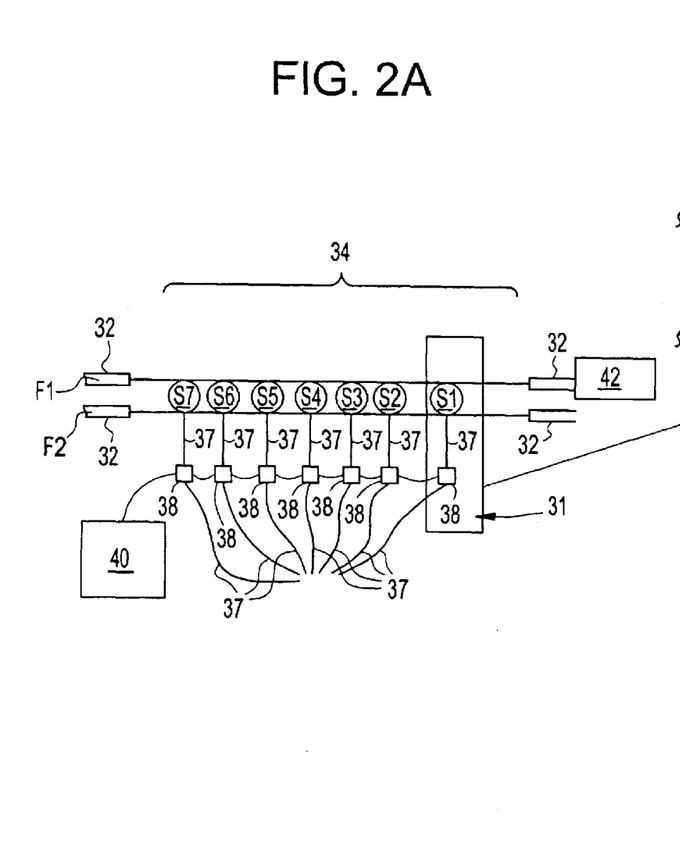
FIG. 2A illustrates an alternate embodiment of an optical router.
Figure 2B:
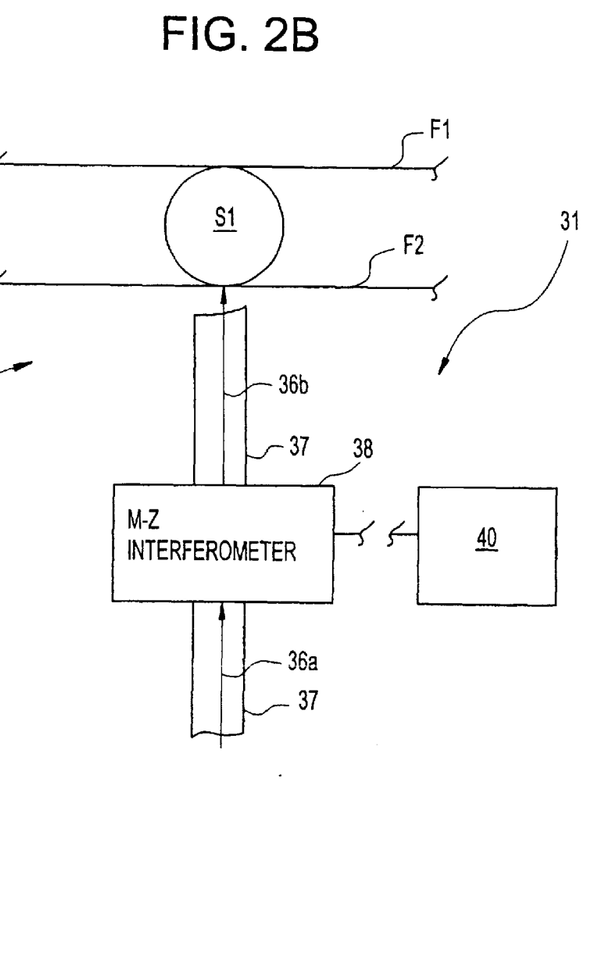
FIG. 2B illustrates a diagram of a component optical switch of the embodiment of FIG. 2A.

Illustrated in FIGS. 2A and 2B is another embodiment of the optical router 30 and optical switches 31. In this embodiment a plurality of microspheres S1–S7 are placed in close proximity to a first optical fiber F1 and a second optical fiber F2. The cladding 32 of the optical fibers F1 & F2 is thinned or removed at the region of close proximity 34. Within the substrate of each microsphere is a light activated material, such as a dye, which can alter the steady state index of refraction "n" of the microspheres when adequately irradiated by an intense beam of light.

Each optical switch operates by the WGM resonance of a microsphere, which may be controlled by altering the index of refraction "n" of the microsphere, such that the evanescent waves emanating from the electromagnetic fields associated with a signal in a particular channel within one optical fiber resonates in WGM across the surface of the selected microsphere to a channel in another the optical fiber.

Depending on the selection of the light activated material and the material comprising the substrate of the microsphere, the irradiation will either change the dielectric constant of the light activated material and effect the average dielectric constant of the microsphere, or effect the dielectric constant of the light activated material and the substrate thereby altering the dielectric constant of the microsphere. In both cases the change in the dielectric constant will alter the steady state index of refraction "n" of the microsphere.

Generally, the size of each microsphere S1–S7 corresponds to the wavelength of light (channel) the microsphere can effectively resonate for in WGM. Therefore, an optical router 30 with seven distinctly sized microspheres forming seven optical switches 31 can route up to seven channels. Control of the optical routing is accomplished by controlling the optical switches 31, which in turn is accomplished by altering the steady state index of refraction "n" of a selected microsphere within a selected optical switch 31, by either irradiation of the microsphere with an intense beam of light or by briefly terminating such irradiation.

In a "dissimilar" configuration the steady state index of refraction "n' of the microspheres S1–S7 is substantially dissimilar to the index of refraction of optical fibers F1 & F2. To optically switch signal between optical fibers F1 & F2, an adequately intense beam of light directed at the appropriate microsphere in the optical router 30 will alter the steady state index of refraction "n' of the microsphere to become substantially similar to the index of refraction of the optical fibers F1 & F2 thereby switching signal between optical fibers via WGM resonance.

In a "similar" configuration the steady state index of refraction "n' of the microsphere is substantially similar to the index of refraction of optical fibers F1 & F2. To switch signal between optical fibers F1 & F2 the adequately intense beam of light directed at the selected microspheres within the router 30 is terminated, thereby allowing the index of refraction "n' of the microsphere to return to its steady state which is substantially similar to the index of refraction of the optical fibers F1 & F2, and switching signal between optical fibers via WGM resonance will occur.

The irradiation of the microspheres S1–S7 within the optical switches 31 of the optical router 30 may be accomplished with a laser beam 36a & 36b passing through an illuminating fiber 37. For each optical switch 31 (FIG. 2B) the laser beam 36a passes through a Mach-Zender interferometer 38 whereby the laser beam 36a is either intensified through constructive interference or weakened through destructive interference. Because the Mach-Zender interferometer 38 operates in a matter of a few nanoseconds or even picoseconds the adequately intense beam of light directed at a selected microsphere can occur or be terminated for a brief period of time, thereby allowing for rapid optical switching and routing. A computer 40 is used to control the Mach-Zender interferometer 38 and to select which microsphere to enable WGM resonance in. Any residual light transmission in a switched optical fiber may, as is commonly the case, be removed with an attenuator 42.

Figure 3A:
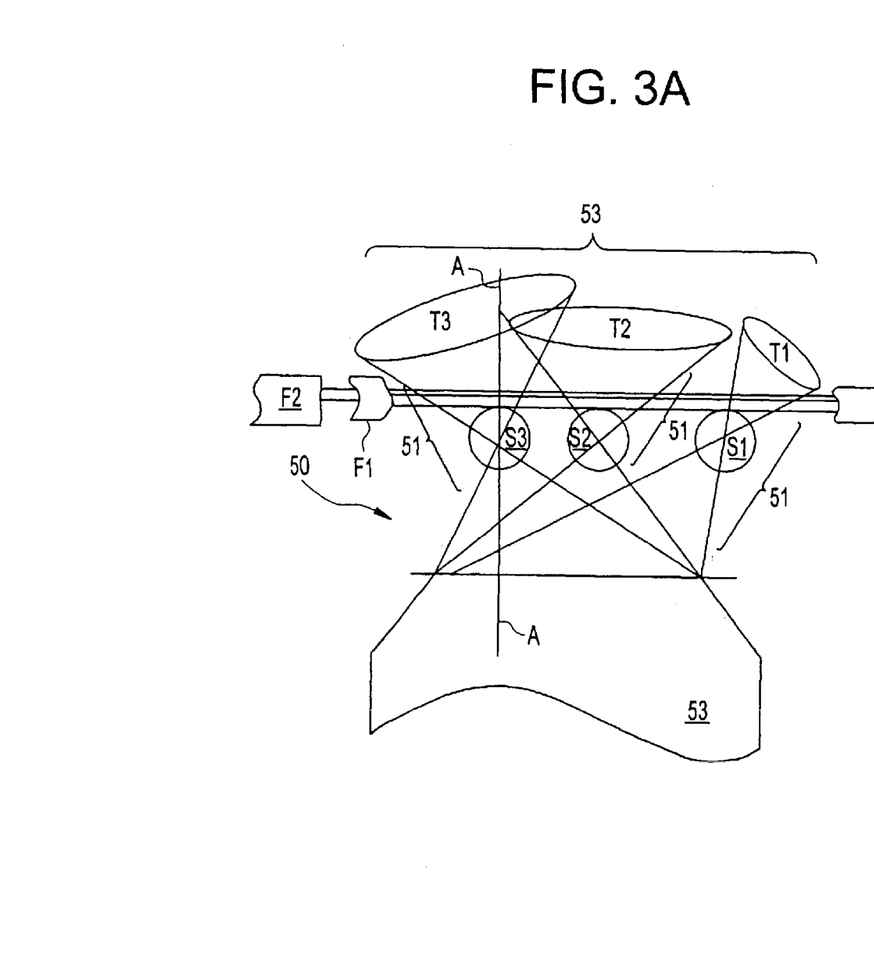
FIG. 3A illustrates a partial perspective view of an alternate embodiment for an optical router.
Figure 3B:
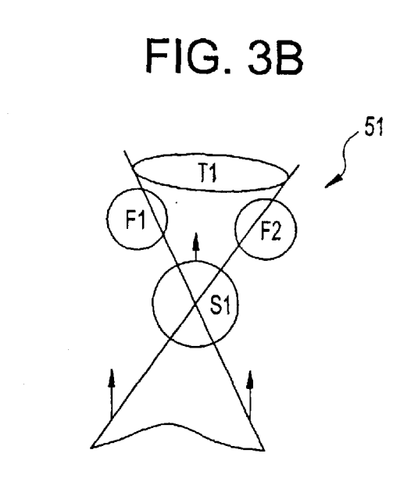
FIG. 3B illustrates a cut away view along the line A—A of the embodiment of FIG. 3A showing an optical switch of the router in the "off" position.
Figure 3C:
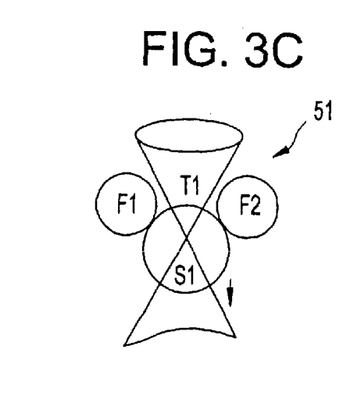
FIG. 3C illustrates a cut away view along the line A—A of the embodiment of FIG. 3A showing an optical switch of the router in the "on" position.

Monitoring, equalizing, grooming and channel balancing within a given channel may be accomplished by adjusting the intensity of the laser beams 36a or 36b irradiating the microspheres to control the index of refraction of "n±x," for the microsphere, wherein as "x" approaches zero, the efficiency of the transfer of the light within the channel approaches the microsphere's maximum obtainable efficiency Illustrated in FIG. 3A is an optical router, generally designated 50, which contains a series of optical switches 51 each operating by the movement of microspheres S1, S2 or S3 in and out of close proximity with an unclad or thinly clad region 52 of a first and second optical fiber F1 & F2 (FIGS. 3B and 3C). Each microsphere has a steady state index of refraction "n" substantially similar to the index of refraction of the unclad or thinly clad region of the optical fibers F1 & F2 that the optical router 50 switches optical signals between.

Generally, the size of each microsphere S1–S3 corresponds to the wavelength of light (channel) the microsphere can effectively resonate for in WGM. Therefore, an optical router 50 with three optical switches 51, each with a microsphere of a different size, can route up to three channels. The movement of the a microspheres S1, S2 or S3 is controlled by containing each microsphere S1, S2 or S3 within an array of independently movable optical traps T1, T2 and T3

Optical traps are produced by the gradient forces arising form passing beamlets of light through a high numerical aperture focusing lens 52 and converging each beamlet of light. The formation of an array of independently movable optical traps capable of manipulating small particles, such as microspheres is known in the art and therefore only an overview description of such formation is provided.

To route a signal from a channel in the first optical fiber F1 to a channel in the second optical fiber F2 the selected optical switch 51 is activated. To activate an optical switch 51 the selected microsphere S1 initially held remote from the unclad or thinly clad regions 53 of the first and second optical fibers F1 & F2 (FIG. 3B) is moved, with an optical trap, into close proximity (FIG. 3C) to the first optical fiber and second optical fiber F1 & F2.

Figure 4:
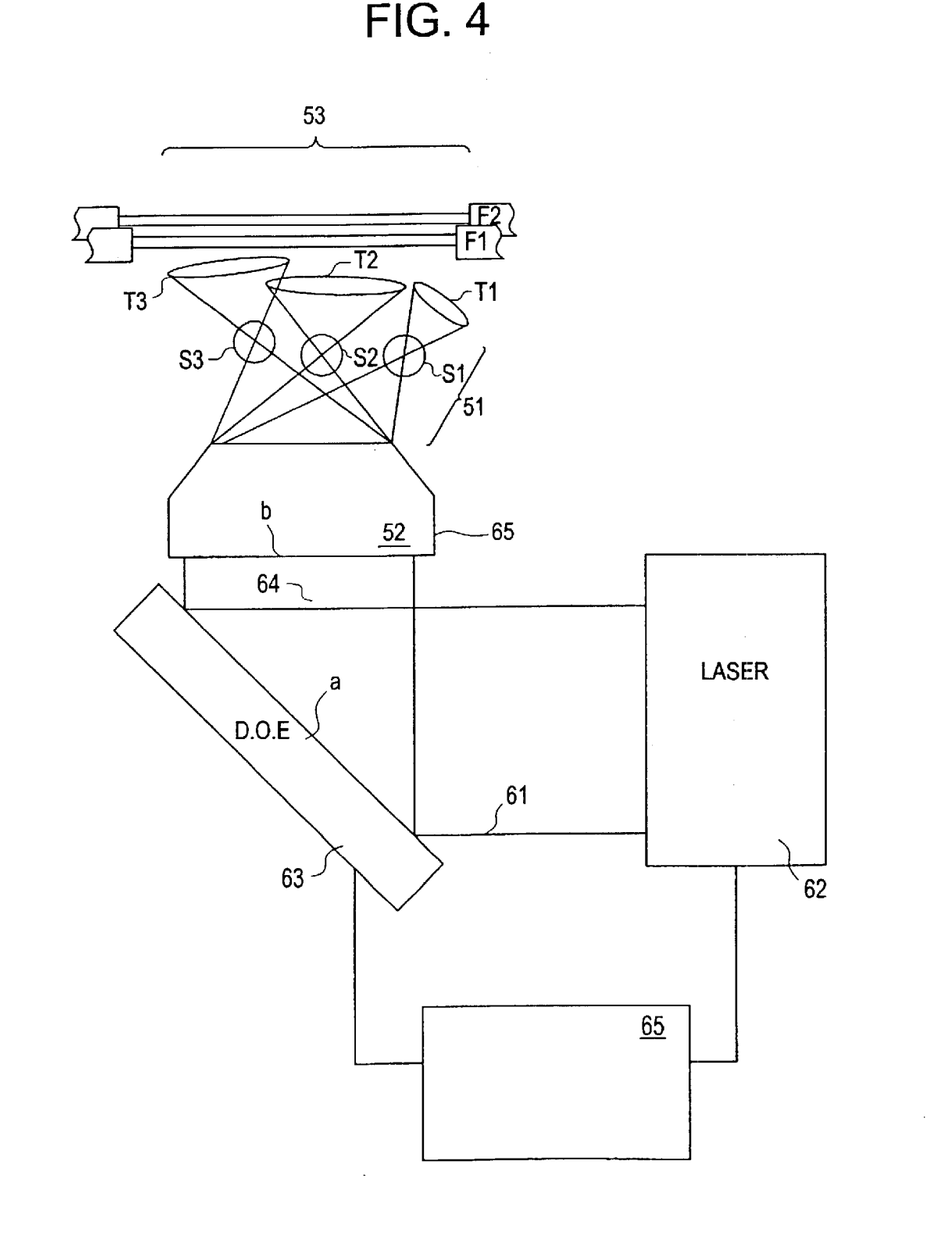
FIG. 4 is a diagram of the optical router and compoenents to generate optical traps of FIG. 3A.

Shown in FIG. 4 is an overview of a system to generate and control the optical traps used to conatin the dielectric microspheres S1–S3. The optical traps T1–T3 (FIG. 3A) are formed by passing a collimated light, preferably a laser beam, produced by a laser 62 at area 'a' of a beam altering optical element 63. The beam altering optical element diffracts the laser beam 61 into a pluarality of beamlets 64 each beamlet passing through area "b" at the back aperture 65 of the focusing lens 52 and coantining a microsphere S1–S3.

Any suitable laser can be used as the source of the laser beam 62. Useful lasers include solid state lasers, diode pumped laser, gas lasers, dye lasers, alexanderite lasers, free electron lasers, VCSEL lasers, diode lasers, Ti-Sapphire lasers, doped YAG lasers, doped YLF lasers, diode pumped YAG lasers and, flash lamp-pumped YAG lasers. Diode-pumped Nd:YAG lasers operating between 10 mW and 5 W are preferred.

When the laser beam 61 is directed at the beam altering optical element 63, the beam altering optical element produces the plurality of beamlets 64 by altering phase profile of the laser beam 61. Depending on the number and type of optical traps desired, the alteration may include diffraction, wavefront shaping, phase shifting, steering, diverging and converging.

Suitable beam altering optical elements are characterized as transmissive or reflective depending on how they direct the focused beam of light or energy. Transmissive diffractive optical elements focus the beam of light or energy, while reflective diffractive optical elements reflect the beam.

A beam altering optical element can also be categorized as being static or dynamic. Examples of suitable static beam altering optical elements include those with one or more fixed surface regions, such as gratings, holograms, stencils, light shaping holographic filters, polychromatic holograms, lenses, mirrors, prisms, waveplates and the like.

Examples of suitable dynamic beam altering optical elements having a time dependent aspect to their function include computer generated diffractive patterns, phase shifting materials, liquid crystal phase shifting arrays, micromirror arrays, piston mode micro-mirror arrays, spatial light modulators, electro-optic deflectors, accousto-optic modulators, deformable mirrors, reflective MEMS arrays and the like. With a dynamic beam altering optical element, the media which comprises the beam altering optical element can be altered, to change the phase pattern imparted to the focused beam of light which results in a corresponding change in the phase profile of the focused beam of light, such as diffraction, or convergence. The beam altering optical element is also useful to impart a particular topological mode to the laser light. Accordingly, one beamlet may be formed in a Guass-Laguerre mode while another beamlet formed in a Guassian mode.

Preferred dynamic optical elements include phase-only spatial light modulators such as the "PAL-SLM series X7665", manufactured by Hamamatsu, of Japan or the "SLM 512SA7," manufactured by Boulder Nonlinear Systems of Layafette Colo. These beam altering optical elements are computer 65 controlled to generate the optical traps T1–T3.

Because the steady state index of refraction "n" of each microsphere S1–S3 corresponds to the index of refraction of the optical fibers F1 & F2 optical switching will occur when the selected microsphere S1 is moved close enough to the unclad or thinly clad regions 52 of the optical fibers F1 & F2. At some distance from the optical fibers F1 & F2 the evanescent wave, associated with the signal of the selected channel, will cross the surface of the selected microsphere S1, via WGM resonance, and switch signal between optical fibers F1 & F2. When the switching is completed the optical trap is quickly withdrawn and the microsphere S1 ceases to switch signal.

By adjusting the distance the microsphere S1 from the unclad or thinly region 52 of the optical fibers F1 & F2 a controllable index of refraction of "n±x" for the microsphere may be obtained, wherein as "x" approaches zero the efficiency of the transfer of signal approaches the microsphere's maximum obtainable efficiency which may be useful for applications such as channel equalizing, grooming and power balancing.

Since certain changes may be made in the above systems apparatus and methods without departing from the scope of the invention herein involved, it is intended that all matter contained in the above description, as shown in the accompanying drawing, the specification, and the claims shall be interpreted in an illustrative, and not a limiting sense.

We claim:

1. A method of optical switching a signal between optical fibers the method comprising:

providing a first optical fiber with an unclad or thinly clad region;

providing a second optical fiber with an unclad or thinly clad region;

placing a dielectric microsphere capable of WGM resonance for a specific wavelength of light with a voltage alterable steady state index of refraction "n" substantially similar to the index of refraction of the optical fibers, in close proximity with the unclad or thinly clad regions of the first and second optical fibers;

placing a pair of electrodes on either side of the dielectric microsphere;

passing voltage adequate to alter the steady state index of refraction "n" of the dielectric microsphere through the pair of electrodes;

providing the specific wavelength of light as a signal within the first optical fiber;

briefly terminating the voltage whereby the index of refraction "n" of the dielectric microsphere returns to its steady state;

switching the signal from the first optical fiber across the dielectric microsphere to the second optical fiber; and, reapplying the voltage.

* * * * *